Dec. 4, 1923.
F. W. ADSIT
SUSPENSION TIRE
Filed Oct. 18, 1919
1,475,925
2 Sheets-Sheet 1
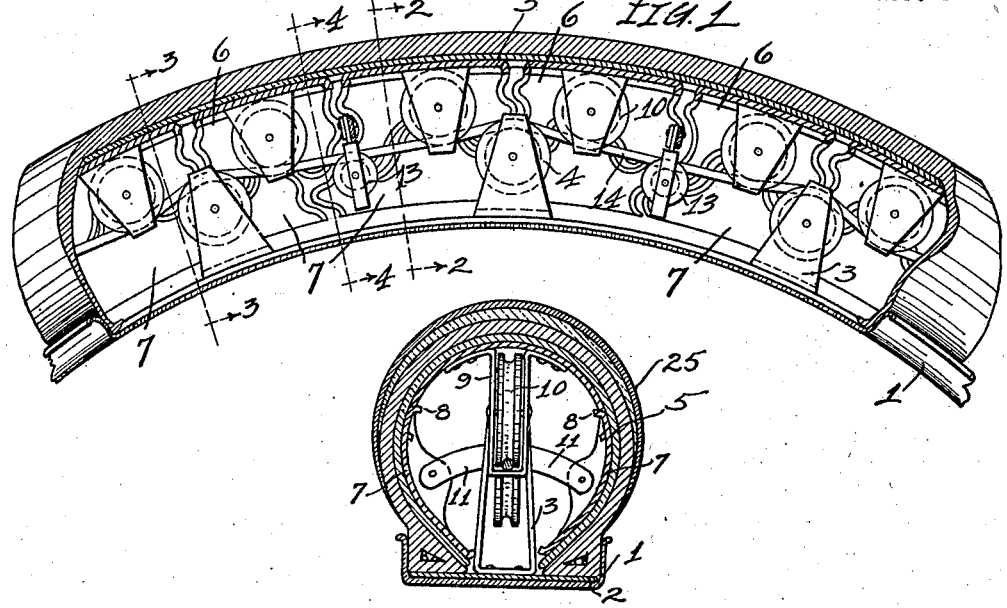
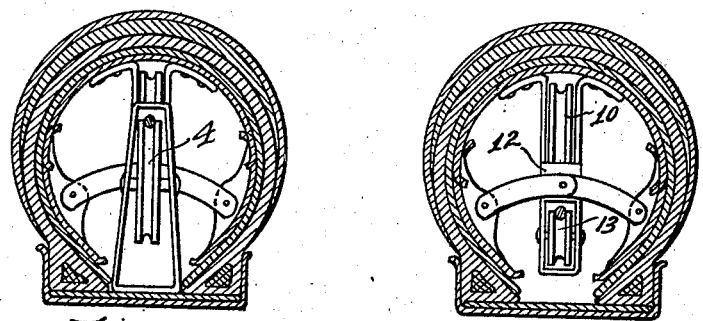
Inventor:
FRANK W. ADSIT
by C. D. Enochs
Attorney.

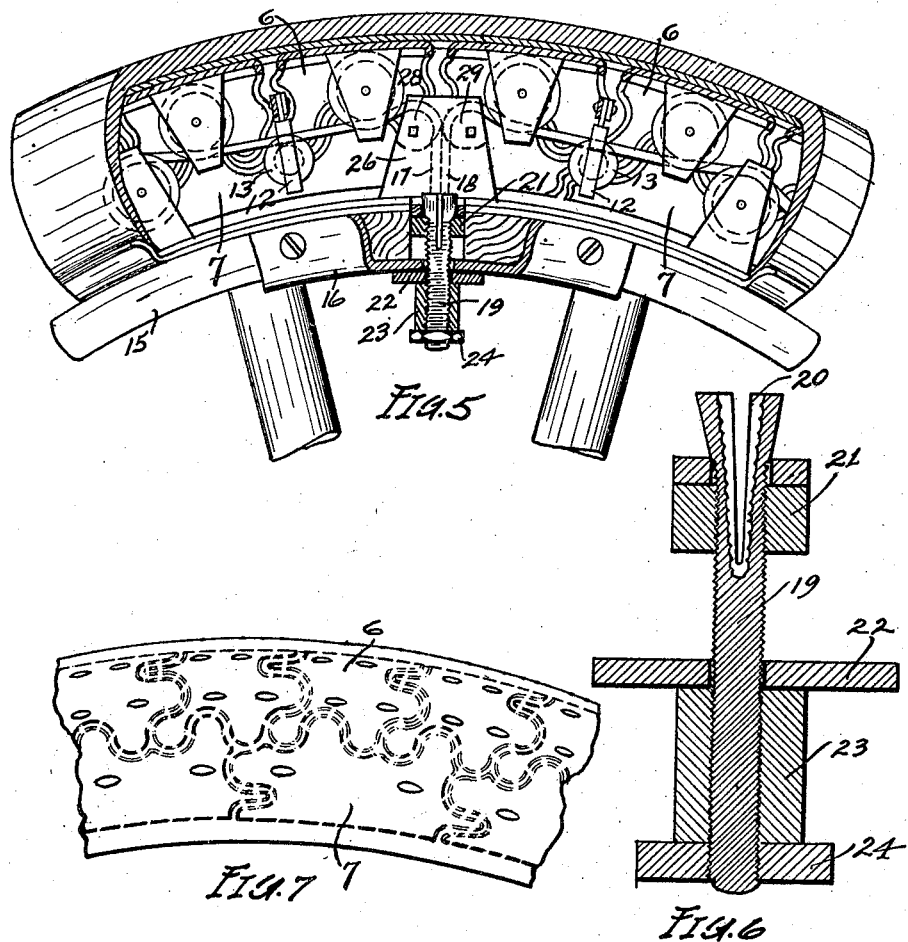

Patented Dec. 4, 1923.

1,475,925

UNITED STATES PATENT OFFICE.

FRANK W. ADSIT, OF ST. PAUL, MINNESOTA.

SUSPENSION TIRE.

Application filed October 18, 1919. Serial No. 332,083.

*To all whom it may concern:*

Be it known that I, FRANK W. ADSIT, a citizen of the United States, and a resident of St. Paul, in the county of Ramsey and State of Minnesota, have invented certain new and useful Improvements in a Suspension Tire, of which the following is a specification.

One object of my invention is to provide a suspension form of support for an outer casing of a tire for an automobile or the like.

Another object of my invention is to provide improved supports for anti-friction members on which the weight carried by the tire may be supported by a cable passing round the interior of the tire.

Another object is to provide interlocking plates joined to a flexible liner, a portion of which carry part of the anti-friction members.

Another object is to provide means for positively spreading the tire sideways when an extra weight or stress is thrown thereon.

With these and incidental objects in view, the invention consists of certain novel features of construction and combination of parts, the essential elements of which are hereinafter described with reference to the drawings which accompany and form a part of this specification.

In the drawings, Figure 1 is a longitudinal sectional view of a portion of a tire, embodying my invention; Figure 2 is a transverse section taken on the line 2—2, Figure 1; Figure 3 is a transverse section taken on the line 3—3, Figure 1; Figure 4 is a transverse section taken on the line 4—4, Figure 1; Figure 5 is a section similar to that shown in Figure 1, but showing the manner in which the cable is tightened; Figure 6 is an enlarged sectional detail showing the bolt used in tightening the cable; and Figure 7 is a side elevation of a fraction of the liner, showing the interlocking plates riveted thereto.

As shown in Figures 1, 2, and 3, the rim 1 carries therearound a canvas strip 2, which has riveted thereto multiple U-shaped supports 3, in which are journalled pulleys 4.

The flexible liner 5 has riveted thereto a series of plates 6 (see Figure 7) in close juxtaposition with plates 7 which are likewise carried by the flexible liner 5, and these plates have scalloped edges, as plainly shown in Figure 7.

The edges of the plates are turned over as at 8, Figure 2, to stiffen the plates and also to prevent any sharp edges coming in contact with the flexible liner.

Riveted to the plates 6 are supports 9, carrying journalled therein pulleys 10, and supported by the hinged links 11 are multiple floating supports 12, carrying journalled therein pulleys 13.

The cable 14 passes about the interior of the tire and, passing under the multiple pulleys 10 and over the multiple pulleys 4, as viewed in Figure 1, supports the outer portion of the tire on the inner portion of the tire by the lineal strength of the cable.

Positioned between adjacent pulleys 10 the pulleys 13 take a certain amount of thrust from the cable and through the hinged links 11 tend to spread the plates 7 so as to assist in establishing the resiliency of the tire.

Looking at Figure 5 it will be seen that the felly 15 has a guard plate 16 positioned thereover and an aperture is provided through the felly for bringing the ends 17 and 18 of the cable therethrough.

Support 26, mounted on the rim 1, carries grooved drums 28 and 29, respectively, over which the ends of the cable 14 may be easily drawn.

A lock bolt 19 is adapted to receive the two ends 17 and 18 of the cable with a wedge 20 between the two ends, and when the nut 21 is turned toward the split end of the bolt the cable ends are securely gripped by the corrugated surfaces of the bolt.

With the lock bolt positioned in the aperture as shown in Figure 5, a washer 22 is placed thereover and nut 23 is provided for drawing the bolt 19 outwardly from the felly, thereby stretching the cable 14 as taut as desired.

A lock nut 24 is provided to prevent the nut 23 from loosening in use.

The flexible liner 5 is supported by a carcass or outer casing 25, Figure 2, which may be built up in any suitable manner and locked to the rim 1 in any of the manners known to those skilled in the art.

While I have described my invention and illustrated it in one particular design, I do not wish it understood that I limit myself to this construction, as it is evident that the application of the invention may be varied in many ways within the scope of the following claims.

Claims:

1. In a suspension tire the combination with a hollow carcass, of a cable positioned concentric therewith and within the hollow thereof, anti-friction supports positioned exteriorly of said cable and supporting the tread portion of said carcass, anti-friction members positioned within said cable and supported by the side walls of said carcass, whereby pressure exerted on the tread of said carcass may be transmitted through said cable to the side walls of said carcass.

2. In a suspension tire the combination with a hollow carcass, of a flexible liner, multiple side plates riveted to said liner, multiple tread plates riveted to said liner, said side plates and said tread plates having their edges scalloped and the tabs thereof in close juxtaposition one to another, without contact therebetween, and means including a cable and anti-friction supports for said cable for transmitting pressure from said tread plates to said side plates.

FRANK W. ADSIT.